United States Patent [19]

Matsumoto et al.

[11] Patent Number: 5,278,452
[45] Date of Patent: Jan. 11, 1994

[54] LIGHTING APPARATUS FOR VEHICULAR DISCHARGE LAMP

[75] Inventors: Akihiro Matsumoto; Kiyoshi Wada, both of Shimizu, Japan

[73] Assignee: Koito Manufacturing Co., Ltd., Tokyo, Japan

[21] Appl. No.: 833,712

[22] Filed: Feb. 11, 1992

[30] Foreign Application Priority Data

Feb. 13, 1991 [JP] Japan .................. 3-040607

[51] Int. Cl.[5] .......................... B60Q 1/04; B60L 1/14
[52] U.S. Cl. .................. 307/10.8; 180/271; 315/83; 340/438; 307/10.1
[58] Field of Search .......... 307/10.8, 10.1; 315/77, 315/82, 83, 84; 340/426, 468, 541, 545, 669, 436, 438, 440; 180/287, 271, 274, 282; 280/728, 734, 735

[56] References Cited

U.S. PATENT DOCUMENTS

| | | | |
|---|---|---|---|
| 3,197,674 | 7/1965 | Hellman | 315/88 |
| 3,321,663 | 5/1967 | Poznik | 315/82 |
| 3,706,966 | 12/1972 | So et al. | 340/428 |
| 3,801,794 | 4/1974 | Mauch et al. | 307/66 |
| 3,858,175 | 12/1974 | Kopera, Jr. | 340/426 |
| 3,997,870 | 12/1976 | Horvath | 340/426 |
| 4,207,500 | 6/1980 | Duve et al. | 315/119 |
| 4,236,099 | 11/1980 | Rosenblum | 315/83 |
| 4,240,009 | 12/1980 | Paul | 315/224 |
| 4,337,418 | 6/1982 | Walz | 315/362 |
| 4,354,174 | 10/1982 | Heidman, Jr. | 315/83 |
| 4,450,384 | 5/1984 | Krokaugger | 315/127 |
| 4,667,131 | 5/1987 | Nilssen | 315/275 |
| 4,724,360 | 2/1988 | Luursema | 315/244 |
| 4,754,255 | 6/1988 | Sanders et al. | 180/287 |
| 4,763,044 | 8/1988 | Nuckolls et al. | 315/176 |
| 4,766,350 | 8/1988 | Husgen et al. | 315/207 |
| 4,797,599 | 1/1989 | Ference et al. | 315/194 |
| 4,901,053 | 2/1990 | Fukamachi et al. | 340/426 |
| 4,963,856 | 10/1990 | Yukitomo | 340/426 |
| 5,068,570 | 11/1991 | Oda et al. | 315/128 |

Primary Examiner—Howard L. Williams
Assistant Examiner—Richard T. Elms
Attorney, Agent, or Firm—Sughrue, Mion, Zinn, Macpeak & Seas

[57] ABSTRACT

Disclosed is a lighting apparatus for a vehicular discharge lamp which prevents the occurrence of an electric shock when the status of a vehicle is changed while the discharge lamp is on, such as when the hood of the vehicle is opened for inspection or repair. A hood open/close detector detects that the hood is opened while the discharge lamp is lit, and upon reception of a detection signal from the detector, the power supply/cutoff circuit opens a cutoff switch means to stop power supply from a battery to a lighting circuit, turning off the discharge lamp. In this manner, a person who opens a hood for work can be kept out of danger of a high voltage that is supplied to the discharge lamp.

3 Claims, 5 Drawing Sheets

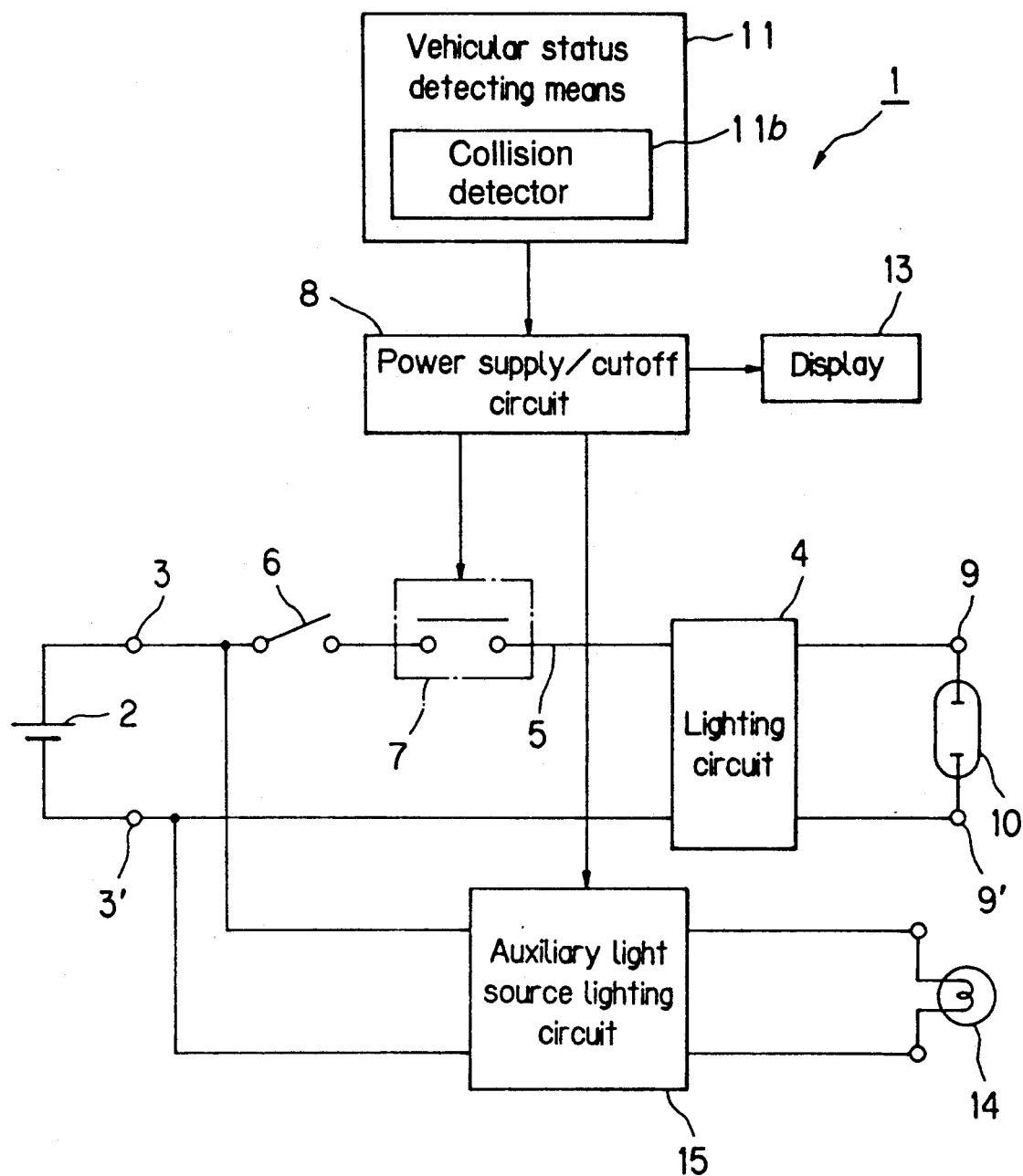

LIGHTING APPARATUS FOR VEHICULAR DISCHARGE LAMP

BACKGROUND OF THE INVENTION

Field of the Invention

The present invention relates to a novel lighting apparatus for a vehicular discharge lamp, which stops power supply to the discharge lamp when a change in the status of the vehicle, such as opening of the hood of the vehicle, is detected while that lamp is on, thus protecting a human body from an electric shock by a high voltage.

Description of the Related Art

An incandescent lamp, such as a halogen lamp, is typically used as a light source for a vehicle. Recently, however, a compact metal halide lamp has become popular. A lighting apparatus for such a metal halide lamp uses a battery as a power source and applies a high voltage, which is the boosted battery voltage, to the lamp.

Since conventional lighting apparatuses deal with a lamp that operates on a relatively low voltage, such as an incandescent lamp, no severe safety countermeasures need be taken. For a metal halide lamp to which a high voltage is to be applied, however, such conventional apparatuses may not be taken as appropriate and adequate.

In repairing an engine or inspecting lights with the hood of a vehicle open while metal halide lamps are lit at night, for example, a repairman or a person who repairs or inspects the parts of vehicle will be in constant danger of a high voltage.

SUMMARY OF THE INVENTION

It is therefore an object of the present invention to provide a lighting apparatus designed to overcome the above shortcoming. To achieve this object, a lighting apparatus according to this invention comprises a means for immediately detecting a change in a vehicular status which may endanger a human body or a vehicle due to a high voltage to be supplied to a discharge lamp, i.e., a hood open/close detecting means for detecting that the hood of the vehicle has been opened, and a power supply/cutoff means for stopping power supply to the discharge lamp when a signal from the detecting means indicates the hood is open.

According to the present invention, when a repairman opens the hood of a vehicle with a discharge lamp lit, the hood open/close detecting means sends a signal to the power supply/cutoff means to stop the power supply to the discharge lamp, thereby preventing an electric shock, etc.

BRIEF DESCRIPTION OF THE DRAWINGS

FIG. 5 is a view similar to FIG. 1 showing an alternate embodiment of the invention.

DETAILED DESCRIPTION OF THE PREFERRED EMBODIMENT

Figure 1:
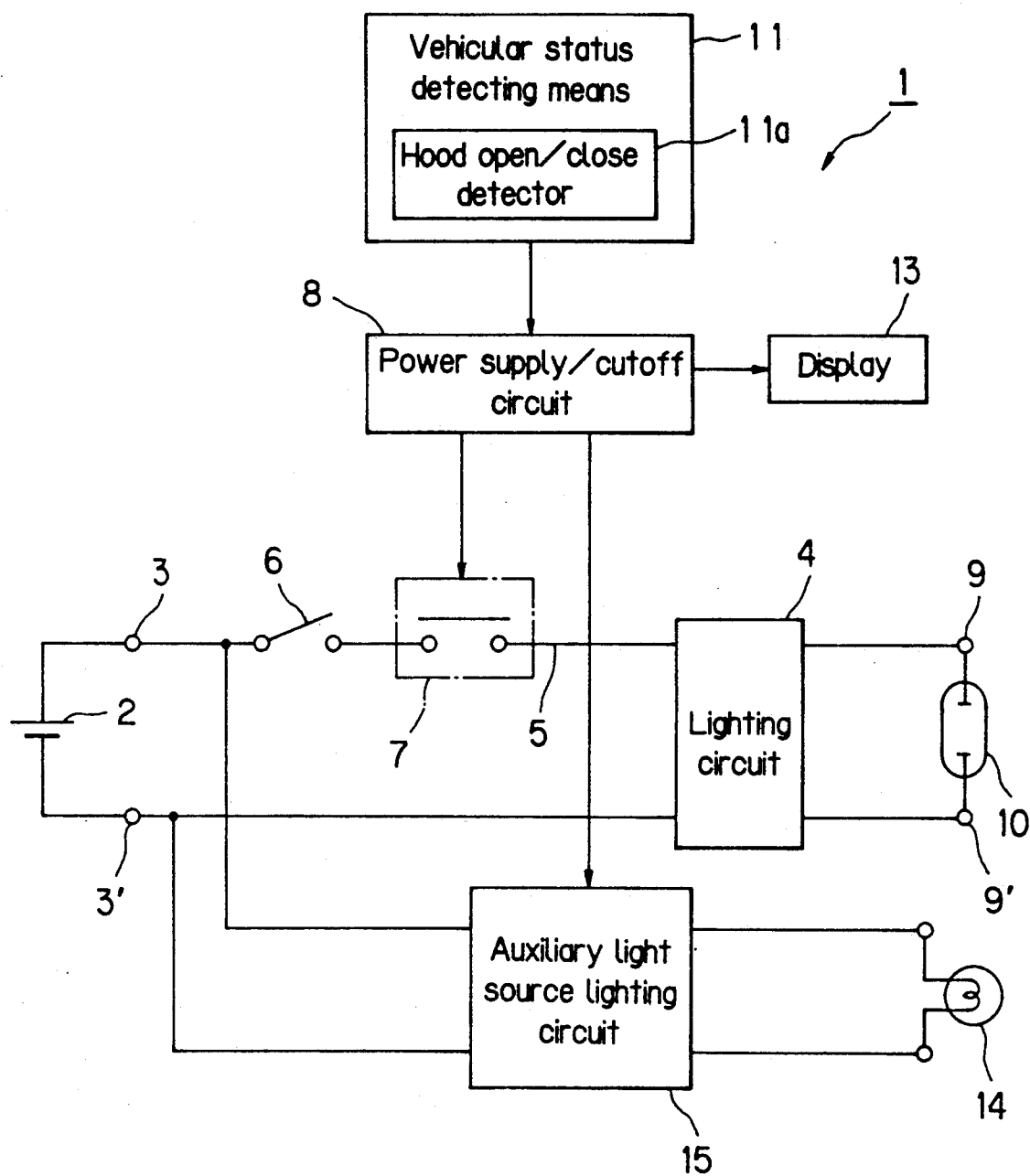
FIG. 1 is a schematic circuit block diagram illustrating a lighting apparatus according to the present invention.

FIG. 1 illustrates the schematic structure of a lighting apparatus 1 embodying the present invention.

A battery 2 as a DC power supply is connected between DC input terminals 3 and 3' of the lighting apparatus 1.

A lighting switch 6 and a cutoff switch means 7 are provided in series on a plus line 5 which connects the DC input terminal 3 and the positive input terminal of a lighting circuit 4. The lighting switch 6 is manually operated. The cutoff switch means 7 is controlled by a signal sent from a power supply/cutoff circuit 8. This switch means 7 consist of, for example, relay contacts or semiconductor switching devices (indicated simply by switch symbols in FIG. 1).

The lighting circuit 4 serves to control a metal halide lamp 10 which is connected to output terminals 9 and 9' of the circuit 4. The lighting circuit 4 may be designed to boost a DC battery voltage and then convert that voltage into an AC voltage before supplying the power to the metal halide lamp 10. The lighting circuit 4 may however have any structure as long as it accomplishes the above function.

Figure 3:
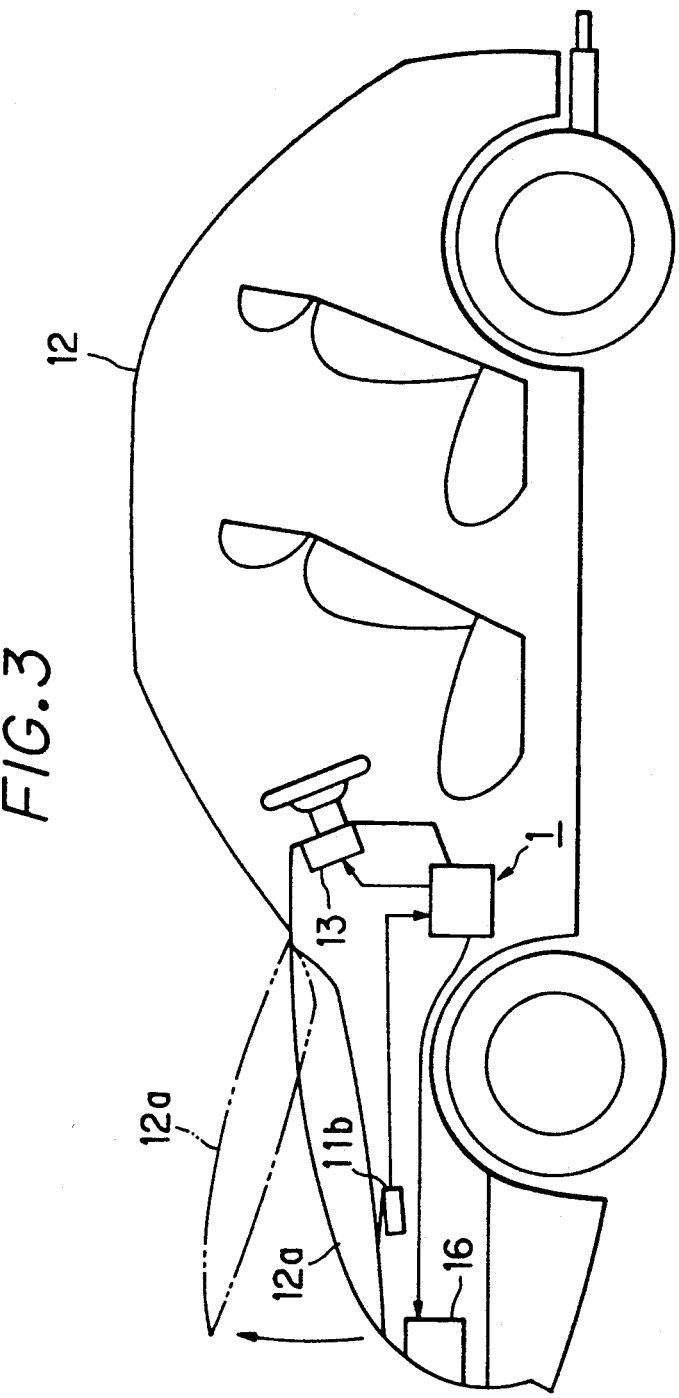
FIG. 3 is a schematic diagram for explaining individual sections of the lighting apparatus according to the present invention in association with parts of a vehicle.

A vehicular status detecting means 11 includes a hood open/close detector 11a. The hood open/close detector 11a detects by means of a sensor 11b whether a hood 12a of a vehicle 12 has been opened or not as shown in FIG. 3, and sends a detection signal to the power supply/cutoff circuit 8. A mechanical switch or an optical or magnetic detect switch may be used as needed as the sensor 11b which detects the opening/closing of the hood 12a.

Informed by a detection signal from the hood open/close detector 11a that the hood 12a is open, the power supply/cutoff circuit 8 will send a signal to the cutoff switch means 7 to open it, stopping the supply of the battery voltage to the lighting circuit 4 and will also send a signal to a display device 13 provided on an instrument panel in the vehicle during the power cutoff to display a warning to that effect using a light-emitting diode, etc. Generating an alarm sound to indicate the power cutoff will draw attention of people outside the vehicle. The power cut off is not permanent; immediately after the hood is closed or after a predetermined time elapses, the power supply will restart, lighting the lamp again.

An auxiliary lighting source 14 is used in substitution for the metal halide lamp 10 when power is cut off by the power supply/cutoff circuit 8.

The auxiliary light source 14 is controlled by an auxiliary light source lighting circuit 15 having a voltage sent from the DC input terminals 3 and 3' as a source voltage. When the cutoff switch means 7 is opened, the auxiliary light source lighting circuit 15 forcibly turns on the auxiliary light source 14 in response to a signal from the power supply/cutoff circuit 8.

An incandescent lamp with a good ignition is used as the auxiliary light source 14. It is however more economical to utilize an existing equipment than to newly provide a lighting device with an auxiliary light source.

Figure 4:
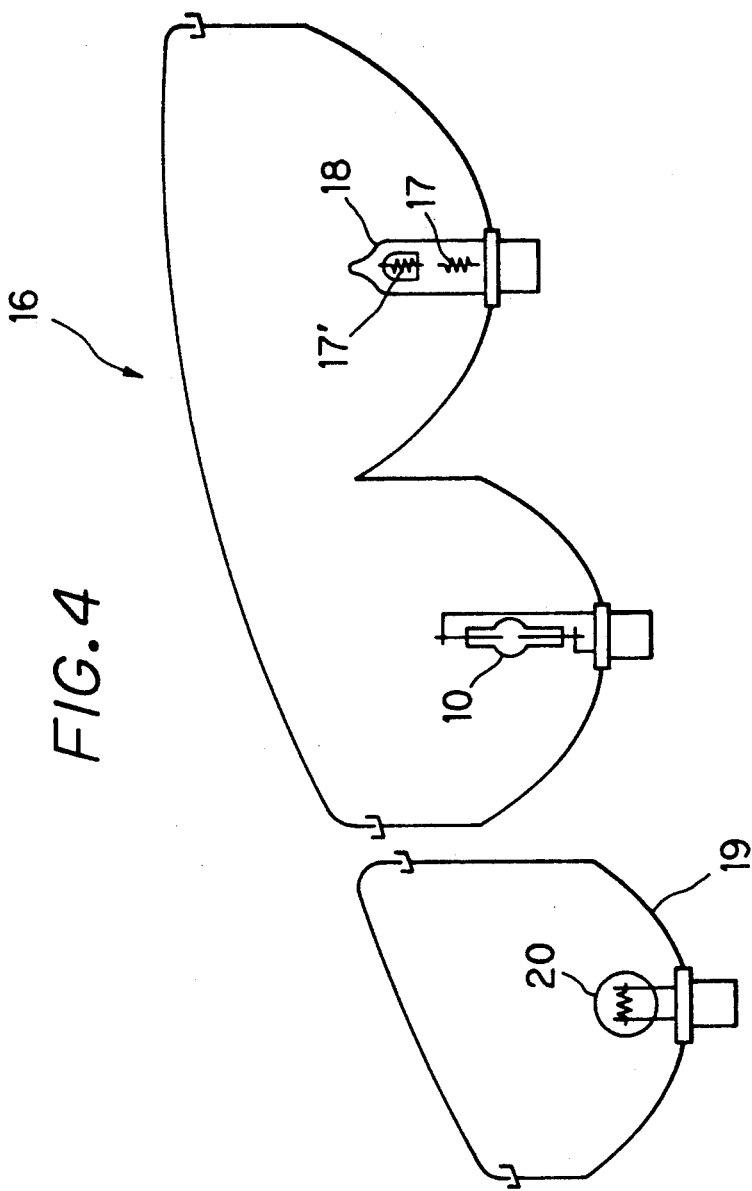
FIG. 4 is a schematic line diagram of a lighting device for explaining an auxiliary light source.

For instance, in a headlamp 16 as shown in FIG. 4, wherein a halogen lamp (H4 bulb, etc.) 18 with a main filament 17 and a subfilament 17' is used for a high beam and a metal halide lamp 10 is used for a low beam, the subfilament 17' of the halogen lamp 18 (the one provided with a shade for forming a cut line in the low beam) or a bulb 20 of a fog lamp 19 attached to a vehicle may be used as an auxiliary light source.

Figure 2:
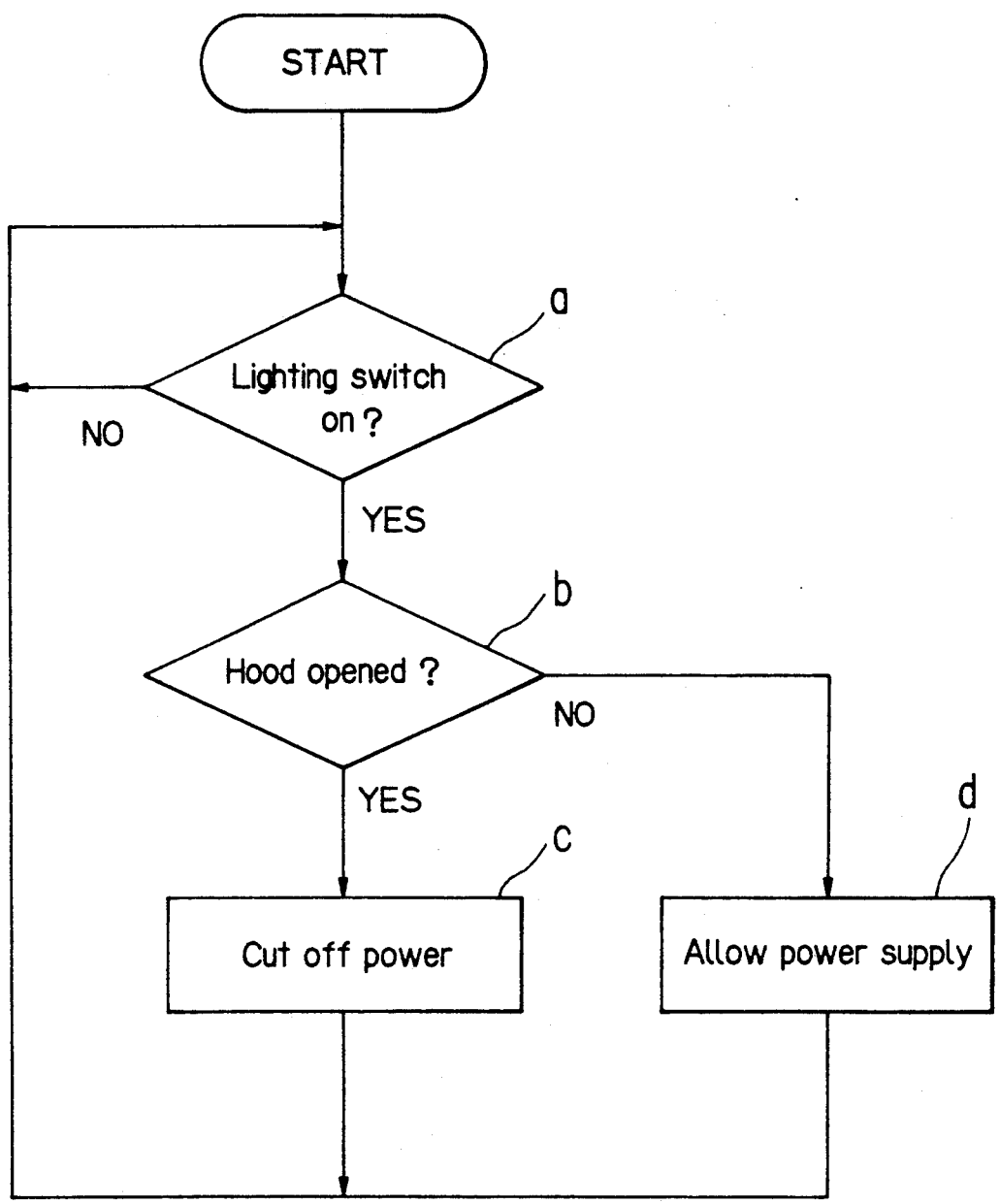
FIG. 2 is a flowchart for explaining the operation of a power supply/cutoff circuit.

The operation of the power supply/cutoff circuit 8 will now be explained referring to a flowchart shown in FIG. 2.

In the first step a, when the lighting switch 6 is in the off state, the lamp is not turned on; however with the lighting switch 6 turned on, the flow advances to the next step b.

It is detected by the hood open/close detector 11a in step b if the hood 12a is opened or closed. If the hood 12a is open, the flow goes to step c where the power supply/cutoff circuit 8 opens the cutoff switching means 7 to turn off the metal halide lamp 10 which has been lit, which will be indicated by the display device 13. At the same time, the auxiliary light source 14 is lit by a signal which is sent to the auxiliary light source lighting circuit 15 from the power supply/cutoff circuit 8.

When the hood 12a is detected as closed in step b, the flow moves to step d in which case the cutoff switch means 7 remains closed to keep the metal halide lamp 10 on.

The vehicular status detecting means 11 is not limited to the hood open/close detector 11a as described above. For instance, as shown in FIG. 5, a collision detector 11b for detecting a collision may be provided, so that power supply to the discharge lamp may be cut off in accordance with the detection signal from such means.

As apparent from the above description, a lighting apparatus for a vehicular discharge lamp according to the present invention comprises the hood open/close detecting means as a means for detecting a change in the state of a vehicle when the discharge lamp is lit. When this means detects the hood being open, the power supply/cutoff means will stop power supply to the discharge lamp, thereby preventing an electric shock while inspecting the engine or lights of the vehicle.

What is claimed is:

1. A lighting apparatus for use with high-voltage discharge-type headlamps mounted on a motor vehicle, comprising:
    a high-voltage power supply for providing a high-voltage for operating said headlamps;
    a hood open/close detector for detecting an open/-closed state of a hood of said vehicle;
    a power supply/cutoff circuit for controlling the supply of power to said power supply in response to an output signal from said hood open/close detector, whereby said high voltage is shut off whenever said hood open/close detector produces an output signal indicating that said hood is in an open state.

2. The lighting apparatus according to claim 1, further comprising an auxiliary light source and a lighting circuit for said auxiliary light source, said lighting circuit for said auxiliary light source being controlled by said output signal from said open/close detector, whereby said auxiliary light source is lit when said signal produced by said hood open/close detector indicates that said hood is in said open state.

3. A lighting apparatus for use with high-voltage discharge-type headlamps mounted on a motor vehicle, comprising:
    a high-voltage power supply for providing a high-voltage for operating said headlamps;
    a collision detector for detecting a collision of said vehicle;
    a power supply/cutoff circuit for controlling the supply of power to said power supply in response to an output signal from said collision detector, whereby said high voltage is shut off whenever said collision detector produces an output signal indicating a collision of said vehicle.

* * * * *